(12) United States Patent
Fan et al.

(10) Patent No.: US 12,399,365 B2
(45) Date of Patent: Aug. 26, 2025

(54) OPTICAL WAVEGUIDE UNIT, ARRAY, AND FLAT LENS

(71) Applicant: ANHUI EASPEED TECHNOLOGY CO., LTD., Anhui (CN)

(72) Inventors: Chao Fan, Anhui (CN); Dongcheng Han, Anhui (CN)

(73) Assignee: ANHUI EASPEED TECHNOLOGY CO., LTD., Hefei (CN)

( * ) Notice: Subject to any disclaimer, the term of this patent is extended or adjusted under 35 U.S.C. 154(b) by 576 days.

(21) Appl. No.: 17/451,077

(22) Filed: Oct. 15, 2021

(65) Prior Publication Data

US 2022/0035094 A1 Feb. 3, 2022

Related U.S. Application Data

(63) Continuation of application No. PCT/CN2019/087108, filed on May 15, 2019.

(51) Int. Cl.
*G02B 27/01* (2006.01)
*F21V 8/00* (2006.01)
*G02B 6/42* (2006.01)

(52) U.S. Cl.
CPC ........ *G02B 27/0172* (2013.01); *G02B 6/0076* (2013.01); *G02B 6/4206* (2013.01); *G02B 6/425* (2013.01)

(58) Field of Classification Search
CPC .... G02B 6/0076; G02B 6/4206; G02B 6/425; G02B 6/0028; G02B 6/0078; G02B 17/006; G02B 30/56; G02B 6/10; G02B 1/11; G02B 2003/0093; G02B 27/0172
USPC ............................................ 385/15, 129–132
See application file for complete search history.

(56) References Cited

U.S. PATENT DOCUMENTS

| | | | |
|---|---|---|---|
| 2003/0025885 A1* | 2/2003 | Cotton | G03B 21/62 353/69 |
| 2015/0029585 A1 | 1/2015 | Imamura et al. | |
| 2015/0212335 A1 | 7/2015 | Shimatani | |
| 2016/0062097 A1 | 3/2016 | Nagao et al. | |
| 2017/0131460 A1* | 5/2017 | Lin | G02B 6/0026 |

(Continued)

FOREIGN PATENT DOCUMENTS

| | | |
|---|---|---|
| CN | 107340567 | 11/2017 |
| CN | 107807417 | 3/2018 |
| CN | 107807417 A | 3/2018 |

(Continued)

OTHER PUBLICATIONS

Office Action from related European Appln. No. 19928498.5, dated Sep. 13, 2022.
Office Action from related Japanese Appln. No. 2021-549535, dated Jul. 26, 2022. English translation attached.
Search Report from related Japanese Appln. No. 2021-549535, dated Jul. 27, 2022. English translation attached.

(Continued)

*Primary Examiner* — Michael Stahl
(74) *Attorney, Agent, or Firm* — Grossman, Tucker, Perreault & Pfleger, PLLC

(57) ABSTRACT

An optical waveguide unit, an optical waveguide array including optical waveguide units, and a flat lens including optical waveguide arrays. The optical waveguide unit includes: at least one group of total reflection layers, each group including at least one type of total reflection layer, and each type of total reflection layer including at least one single total reflection layer; and at least two sub-waveguides, one group being arranged between every two adjacent sub-waveguides.

14 Claims, 6 Drawing Sheets

(56) References Cited

U.S. PATENT DOCUMENTS

2018/0045972 A1    2/2018  Dai et al.
2020/0031712 A1    1/2020  Nakano et al.

FOREIGN PATENT DOCUMENTS

| CN | 109917513 A | * | 6/2019 |
|---|---|---|---|
| JP | 2004-287181 A | * | 10/2004 |
| JP | 2016180785 A | | 10/2016 |
| JP | 2016224110 | | 12/2016 |
| JP | 2016224110 A | | 12/2016 |
| JP | 2017053922 A | | 3/2017 |
| JP | 2017181854 A | | 10/2017 |
| WO | 2017043456 A1 | | 3/2017 |
| WO | 2017175671 A1 | | 10/2017 |
| WO | 2018105445 A1 | | 6/2018 |

OTHER PUBLICATIONS

Office Action from related Singaporean Appln. No. 11202111359P, dated Jan. 31, 2023. English translation attached.
Notice of Reasons for Refusal from related Japanese Appln. No. 2021-549535, dated Feb. 22, 2023. English translation attached.
International Search Report from corresponding PCT Appln. No. PCT/CN2019/087108, dated Dec. 23, 2019.
Request for the Submission of an Opinion of the corresponding KR application No. 10-2021-7031514 issued on Jan. 15, 2024 from the KIPO. (english translation attached).
Notice of Reasons for Refusal for JP Corresponding Application No. 2023-143921 issued on Jul. 9, 2024 from the JPO. (2 pages) (english translation attached).
Invitation to Amend from SG Application 10202400963P, issued on Apr. 9, 2025. (4 pages).

* cited by examiner

OPTICAL WAVEGUIDE UNIT, ARRAY, AND FLAT LENS

FIELD

The present disclosure relates to the field of optical display, and in particular, to an optical waveguide unit, an optical waveguide array including optical waveguide units, and a flat lens including optical waveguide arrays.

BACKGROUND

Requirements on imaging characteristics are increasing with the development of air imaging technologies. On one hand, a higher resolution is required, a picture sharpness observed is ensured as well as a small distortion requirement is also satisfied. On another hand, three-dimensional (3D) display characteristics and naked-eye 3D holographic display are both required.

Imaging technologies in the related art mainly adopts a lens for imaging Due to the limitation of a field of view and aperture. The lens imaging manner has optical aberrations such as spherical aberration, coma aberration, astigmatism, field curvature, distortion, chromatic aberration. Therefore, the lens imaging manner is greatly limited in the field of large-field and large-aperture imaging display. Most of the naked-eye 3D display technologies in the related art may realize a 3D sense by adjusting a parallax between left eye and right eye, but may not be actual 3D display technologies.

When light at an angle of $\theta$ is incident in an equivalent optical waveguide unit in the related art, a schematic diagram of a loss region is illustrated in FIG. 1, where b0' represents a size of the loss region. At the same time, the equivalent optical waveguide unit in the related art is more sensitive to light incident at different angles. As the angle changes, the loss region of the optical waveguide to light becomes larger, resulting in serious the loss of light energy, and part of the lost light may cover an image surface to from ghost light, to affect the viewing effect. In addition, due to the different sizes of the loss regions formed by light incident from different angles, light intensities at various viewing angles formed by focusing light through a flat lens in the related art are uneven, which affects the actual viewing effect.

SUMMARY

An optical waveguide unit according to embodiments of a first aspect of the present disclosure includes: at least one group of total reflection layers, each group including at least one type of total reflection layer, and each type of total reflection layer including at least one single total reflection layer; and at least two sub-waveguides, one group being arranged between every two adjacent sub-waveguides.

An optical waveguide array according to embodiments of a second aspect of the present disclosure includes: a plurality of optical waveguide units according to embodiments of the first aspect of the present disclosure, each optical waveguide unit having a rectangular cross section, and the plurality of optical waveguide units being joined in parallel; an outer contour of the optical waveguide array is rectangular, and an extending direction of the optical waveguide units and at least two sides of the outer contour of the optical waveguide array form an angle of 30 to 60 degrees.

A flat lens according to embodiments of a third aspect of the present disclosure includes two transparent substrates, each transparent substrate having two optical surfaces; two optical waveguide arrays according to embodiments of the second aspect of the present disclosure, in which the two optical waveguide arrays are arranged between the two transparent substrates by means of glue, and optical waveguide extending directions of the two optical waveguide arrays are arranged orthogonally.

Additional aspects and advantages of the present disclosure will be set forth in part in the following description which follows, and some will become obvious from the following description or learned through practice of the present disclosure.

BRIEF DESCRIPTION OF DRAWINGS

The above and/or additional aspects and advantages of the present disclosure will become apparent and readily appreciated from the following description of embodiments, taken in conjunction with the accompanying drawings, in which.

Figure 1:
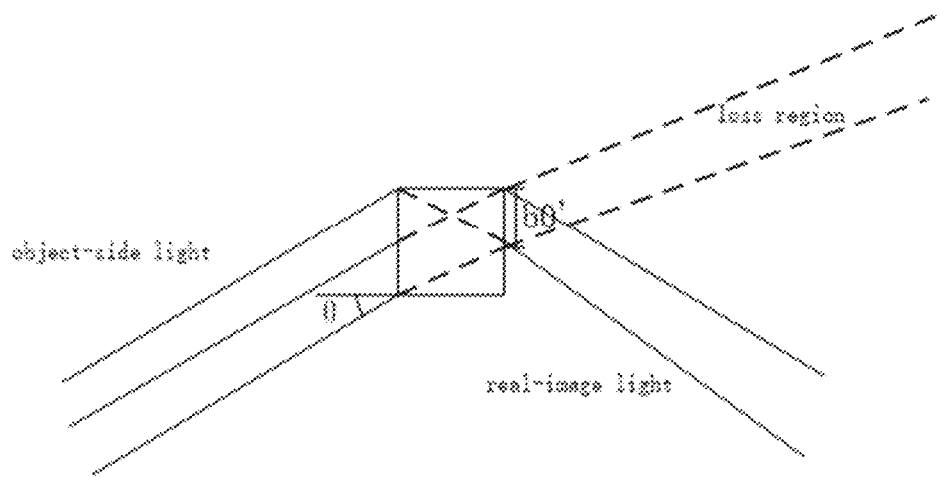
FIG. 1 is a schematic diagram of a loss region of incident light at an angle $\theta$ in an equivalent optical waveguide unit in the related art.

THE REFERENCE NUMERALS optical waveguide array 1000a, 1000b;
optical waveguide unit 100; group 1 of total reflection layers; total reflection layer 11;
sub-waveguide 2; reflection layer 3; adhesive layer 4;
first embodiment: sub-waveguides 211 and 212; total reflection layer 111; second embodiment:

sub-waveguides 221, 222, 223, 224; first type 1121 of total reflection layer; second type 1122 of total reflection layer; transparent substrate 2000; antireflection film 2100.

DETAILED DESCRIPTION

The embodiments of the present disclosure will be described in detail below. The embodiments described with reference to the accompanying drawings are illustrative. The embodiments of the present disclosure will be described in detail below.

An optical waveguide array according to embodiments of the present disclosure will be described first with reference to FIGS. 1 to 5.

Figure 2A:
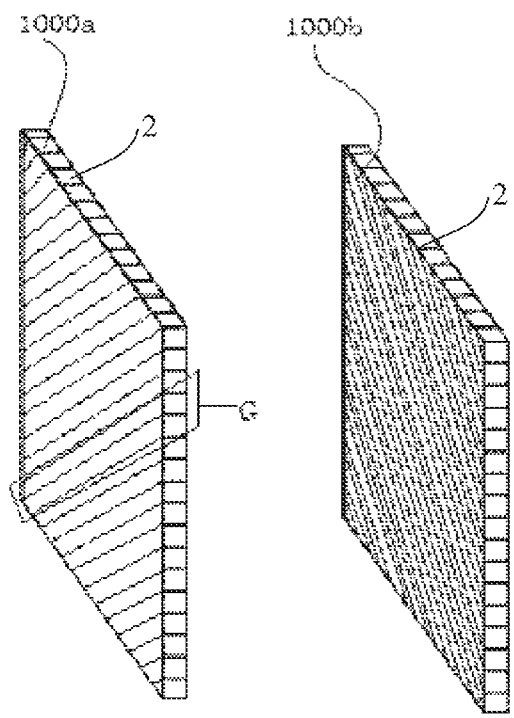
FIG. 2a is a schematic view of an optical waveguide array according to embodiments of the present disclosure, in which two optical waveguide arrays are arranged orthogonally.
Figure 2B:
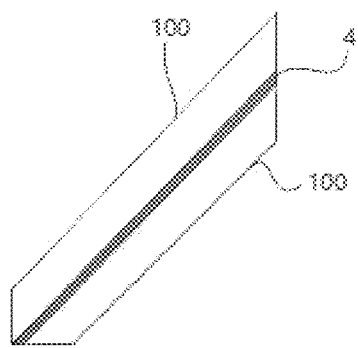
FIG. 2b is an enlarged view of FIG. 2a at block G.

As illustrated in FIG. 2a and FIG. 2b, an optical waveguide array 1000a and an optical waveguide array 1000b each includes a plurality of optical waveguide units 100. Each optical waveguide unit 100 has a rectangular cross section. The plurality of optical waveguide units 100 are joined in parallel. The outer contour of the optical waveguide array is rectangular, and the extending direction of the optical waveguide units 100 and at least two sides of the outer contour of the optical waveguide array form an angle of 30 to 60 degrees. Alternatively, the extending direction of the optical waveguide units 100 and the at least two sides of the outer contour of the optical waveguide array form an angle of 45 degrees. The "at least two sides" may be two sides of the outer contour of the optical waveguide array parallel to each other, may also be two sides of the outer contour of the optical waveguide array perpendicular to each other, or may be four sides of the outer contour of the optical waveguide array. Of course, the present disclosure is not limited to this, and a large size requirement may be achieved by splicing a plurality of optical waveguide arrays when a large screen is displayed. The overall shape of the optical waveguide arrays is set according to application scene requirements.

In the example illustrated in FIGS. 2a and 2b, the outer contours of the optical waveguide arrays 1000a, 1000b are both rectangular. As illustrated in FIG. 2a, the optical waveguide unit(s) extending between two diagonal corners of the rectangle has the longest length, and the optical waveguide units 100 located at the two opposite corners have the triangular shape and the shortest length. The middle optical waveguide units are in a trapezoidal or parallelogram structure, and the lengths of the optical waveguides are unequal. In some further alternative examples, the optical waveguide unit(s) extending between two diagonal corners of the rectangle may be used as a reference, the optical waveguide units on both sides of the optical waveguide unit(s) extending between two diagonal corners of the rectangle may be symmetrically arranged.

Optical waveguide extending directions of the two optical waveguide arrays 1000a, 1000b are orthogonally arranged to form an equivalent flat lens with a negative refractive index. An extending direction of each optical waveguide in the optical waveguide array 1000a is also orthogonal to an extending direction of each optical waveguide in the optical waveguide array 1000b.

Figure 4:
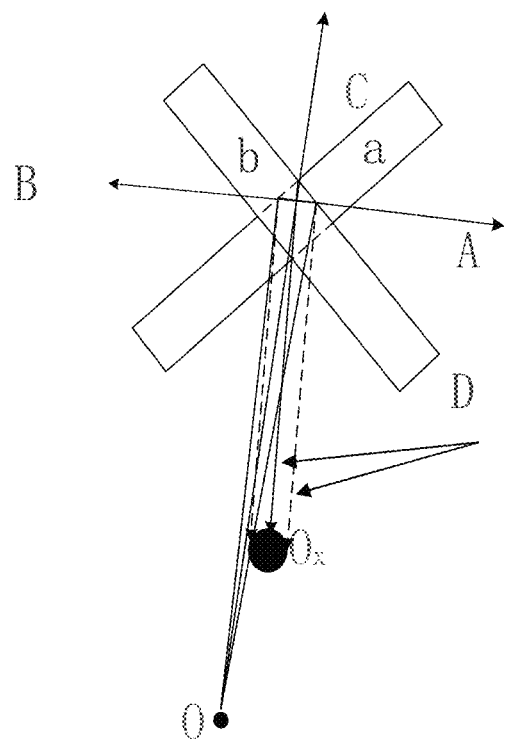
FIG. 4 is a schematic diagram of a principle for modulating light in an overlapping region when two optical waveguide units are placed orthogonally according to embodiments of the present disclosure.
Figure 5:
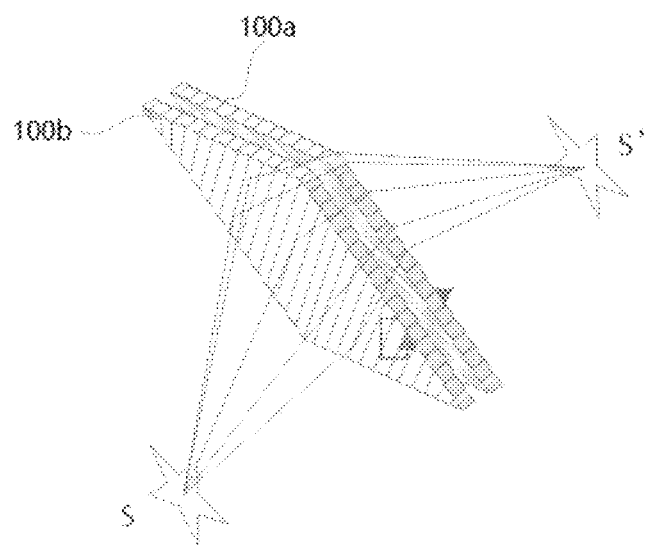
FIG. 5 is a schematic view of a principle for imaging when two optical waveguide arrays are orthogonal according to embodiments of the present disclosure.

FIG. 4 is a schematic diagram of a principle for modulating light in an overlapping region when two optical waveguide units are placed orthogonally according to embodiments of the present disclosure, in which a and b denote two optical waveguide units, A, B denote odd-order reflected light beams, C denotes transmitted stray light, D denotes an imaging light beam, O denotes an object-side light source point, and Ox denotes an image-side imaging point. Therefore, when the two optical waveguide units are orthogonally placed, the object-side light beam and the image-side light beam are mirror-symmetric with respect to the equivalent flat lens with the negative refractive index, and a negative refraction phenomenon index occurs, thereby realizing imaging of the flat lens, as illustrated in FIG. 5.

Figure 3A:
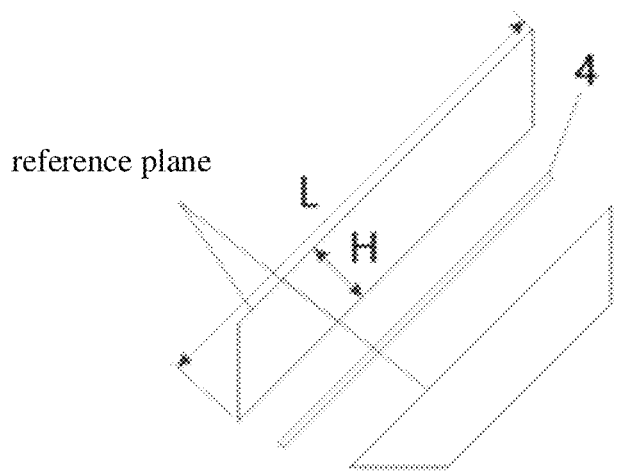
FIG. 3a is a schematic view of two sub waveguides illustrated in FIG. 2b being mated by an adhesive layer.

In some embodiments of the present disclosure, as illustrated in FIG. 3a, the plurality of optical waveguide units 100 are joined through an adhesive layer 4, and a thickness of the adhesive layer 4 is more than 0.001 mm. The adhesive layer 4 is, for example, a photosensitive adhesive or a heat-sensitive adhesive.

The optical waveguide unit according to embodiments of the present disclosure is described below with reference to FIGS. 1 to 10.

The optical waveguide unit 100 according to embodiments of the present disclosure includes: at least one group 1 of total reflection layers and at least two sub-waveguides 2. One group 1 is arranged between every two adjacent sub-waveguides 2. Each group 1 includes at least one type 11 of total reflection layer. Each type of total reflection layer corresponds to an incident angle and has a different optical refractive index. Each type 11 of total reflection layer includes at least one single total reflection layer. The single total reflection layer in each type has the same optical refractive index.

With the optical waveguide unit 100 according to embodiments of the present disclosure, the total reflection layer 11 or the group 1 of total reflection layers may be provided between the sub-waveguides 2, and each type of total reflection layer corresponds to a different incident angle and optical refractive index. Therefore, the light collection efficiency of the overall optical waveguide unit 100 at the specific incident angle may be improved. The light intensity uniformity of the overall viewing angle may be improved.

Optionally, the material of the total reflection layer used in the optical waveguide unit 100 according to embodiments of the present disclosure includes optical glue, optical plastic, optical glass, and the like.

The specific principle of the optical waveguide unit 100 according to the embodiments of the present disclosure will be described below.

With reference to FIG. 4, the incident light from the object-side light source point O is reflected inside the equivalent optical waveguide unit and divided into four beams. As illustrated in FIG. 4, one beam participates in imaging, and the three beams form interference stray light, namely A, B and C. In order to reduce the influence of ghost images formed by stray light on imaging, the two optical waveguide arrays are arranged at 45° and orthogonal to each other.

As described above, it is easy for each optical waveguide unit to generate stray light, and the stray light is part of the original object light, but may not participate in imaging, which is loss light. As illustrated in FIG. 1, when a light beam is incident on the optical waveguide array in the related art at a certain incident angle, there is a loss region with a size b0'. Since the object-side light source is a large-divergence angle light source, the incident angle changes continuously with the light emission of different light sources. The smaller the angle, the larger the loss region and the more serious the light loss, which greatly reduces the light energy utilization rate of the flat lens formed by the optical waveguide array. In addition, different incident angles lead to different energy losses, causing uneven energy in various viewing angles, and affecting the effect of observers observing objects under different viewing angles.

Figure 6:
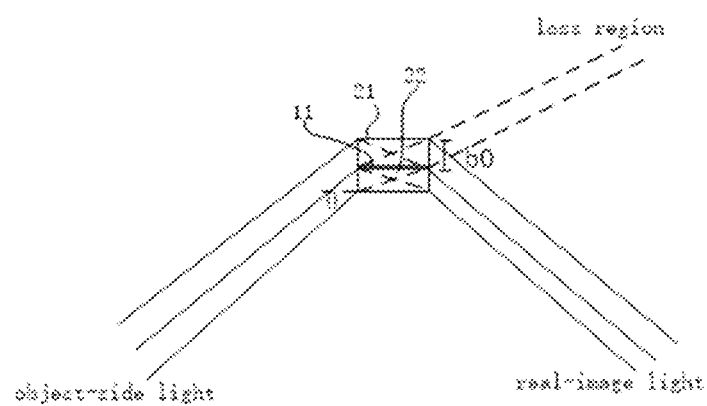
FIG. 6 is a schematic diagram of a loss region of incident light at an angle $\theta$ in an optical waveguide unit according to embodiments of the present disclosure.
Figure 7:
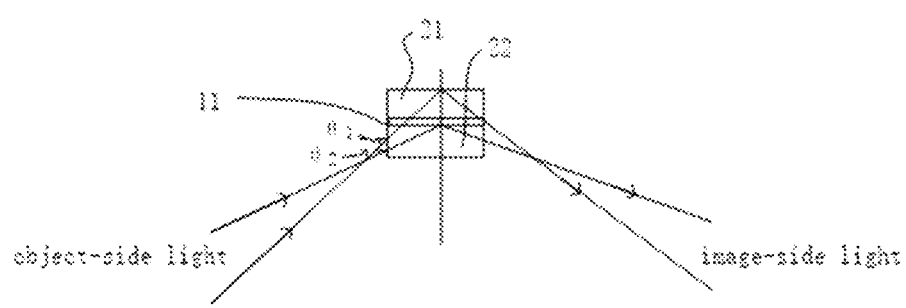
FIG. 7 is a schematic diagram of reflection and transmission of light having an angle larger and smaller than a critical angle of a total reflection layer after a total reflection layer and a sub-waveguide are provided in an optical waveguide unit according to embodiments of the present disclosure.

As illustrated in FIG. 6, in order to make full use of light energy and improve the energy uniformity of various incident angles, a plurality of sub-waveguides 2 and a group 1 of total reflection layers or a total reflection layer 11 between the sub-waveguides 2 are arranged in the optical waveguide unit according to embodiments of the present disclosure. Therefore, the light energy located in the loss region b0 may be collected after differentiation of the total reflection layer and the sub-waveguides, and the loss region b0 of light incident from the angle θ may be relatively reduced. As illustrated in FIG. 7, the function of the total reflection layer 11 is as follows: the light incident on the surface of the optical waveguide unit, which has an angle greater than a critical angle, is totally reflected, and light incident on the surface of the optical waveguide unit, which has an angle smaller than the critical angle, is transmitted. The purpose of precise modulation of light near the critical angle may be realized. Therefore, in the disclosure, in order to achieve precise modulation of light near multiple critical angles, it is necessary to provide multiple types 11 of total reflection layers, and the single optical waveguide unit 100 may be divide into multilayer sub-waveguides 1.

Figure 8:
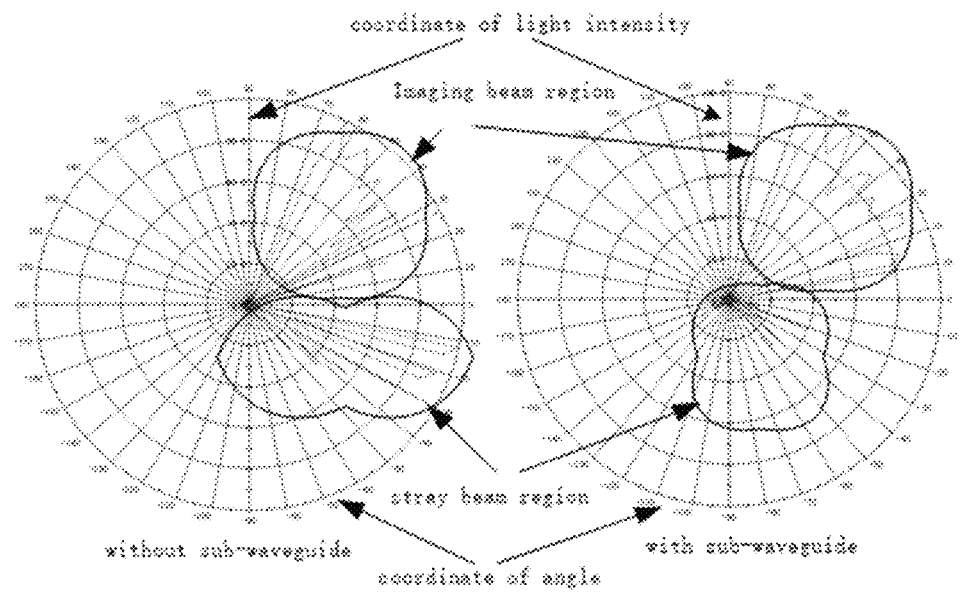
FIG. 8 is a schematic diagram of energy uniformity and stray light at various viewing angles between an optical waveguide unit according to embodiments of the present disclosure and an equivalent optical waveguide unit FIG. 1.

As illustrated in FIG. 8, the left side is a normal optical waveguide unit in the related art, and the right side is an optical waveguide unit according to embodiments of the present disclosure. FIG. 8 illustrates the comparison on energy uniformity and stray light between the two at various viewing angles. It may be seen that the optical waveguide unit 100 according to embodiments of the present disclosure may greatly reduce the loss of light energy and improve the energy uniformity at various viewing angles.

Figure 3B:
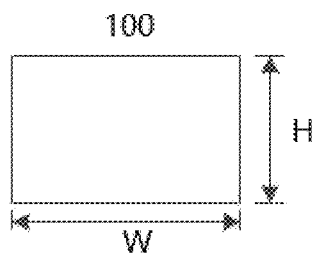
FIG. 3b is a cross-sectional view of any sub waveguide of FIG. 3a, in which W is a width, and H is a height.
Figure 9:
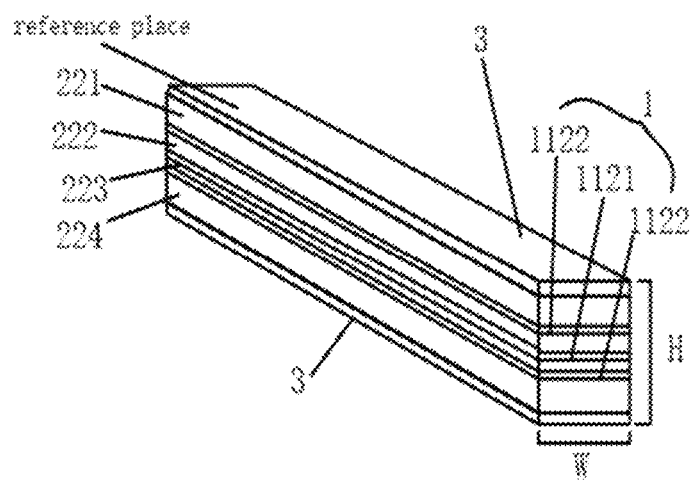
FIG. 9 is a schematic view of an internal structure of an optical waveguide unit according to embodiments of the present disclosure.

As illustrated in FIG. 3b and FIG. 9, a total height H of the optical waveguide unit 100 satisfies 0.1 mm<H<5 mm along a stacking direction of the group 1 and the sub-waveguide 2. In addition, a width of a cross section of the optical waveguide unit 100 is W. The direction of the width W on the cross section is perpendicular to the stacking direction, that is, the direction of the above-mentioned height H, where W also satisfies 0.1 mm<W<5 mm.

According to some embodiments of the present disclosure, for example, a simple example in FIG. 7, a number of the sub-waveguides 2 is two, namely sub-waveguides 21 and 22; and a group 1 of total reflection layers arranged between the two sub-waveguides 2 includes one type 11 of total reflection layer. Thus, the light near one of the critical angles may be precisely modulated.

According to some embodiments of the present disclosure, as illustrated in FIG. 9, there are four sub-waveguides 221, 222, 223, and 224. A number of the groups 1 of total reflection layers is three. The groups 1 include a first type 1121 of total reflection layer in middle; and two second types 1122 of total reflection layers. A refractive index of the second type 1122 of total reflection layer is different from a refractive index of the first type 1121 of total reflection layer. The two second types 1122 of total reflection layers are located on both sides of the first type 1121 of total reflection layer along the stacking direction of the total reflection layer 11 and the sub-waveguide 2. In the optional example in FIG. 10, in the stacking direction, the heights of the four sub-waveguides 2 are GH1, GH2, GH3, and GH4 in order, where GH1=GH4=GH2+GH3, GH2=GH3, GH1+GH2=GH3+GH4. In this way, most of the object-side light corresponding to the selected incident angle may be collected, which greatly improves the energy utilization rate of the imaging beam and the beam uniformity.

According to some embodiments of the present disclosure, a number of the sub-waveguides 2 is three, a number of the groups 1 is two, and refractive indexes of the two groups 1 are the same or different, which may not be illustrated in FIGS.

Of course, the present disclosure is not limited to the above several embodiments. According to some embodiments of the present disclosure, a distribution of each total reflection layer 11 in each type 11 of total reflection layer in the group 1 satisfies a formula of:

$$comb(x) = \sum_{i=1}^{k} \sum_{num=1}^{m_i} \delta(x - num \cdot T_i),$$  Formula 1 where, comb(x) represents a comb function;
one side surface of the optical waveguide unit 100 serves as a reference plane along a stacking direction of the group 1 and the sub-waveguide 2, where:
k represents a total number of types 11 in the group;
i represents a serial number of types 11 in the group, and is an integer;
x represents a distance from a single total reflection layer 11 in the $i^{th}$ type 11 of total reflection layer to the reference plane;
num represents a serial number of the single total reflection layer 11 in the $i^{th}$ type 11 of total reflection layer;
$m_i$ represents a total number of total reflection layers in the $i^{th}$ type of total reflection layer;
$T_i$ represents a position period of the $i^{th}$ type 11 of total reflection layer, and the position period is a shortest distance that adjacent appearances of the $i^{th}$ type 11 of total reflection layer in the optical waveguide unit 100; and
δ(x) represents a pulse function.

In further embodiments, the position period $T_i$ is calculated by a formula of:

$T_i = W \cdot \tan(\arcsin(\sin(\theta_i)/n))/\sqrt{2}$,  Formula 2:

where, W represents a width of a cross section of the optical waveguide unit 100, a direction of the width on the cross section is perpendicular to the stacking direction;
$\theta_i$ represents an incident angle corresponding to the $i^{th}$ type 11 of total reflection layer on a surface of the optical waveguide unit 100; and
n represents a refractive index of the sub-waveguide 2.

Figure 10:
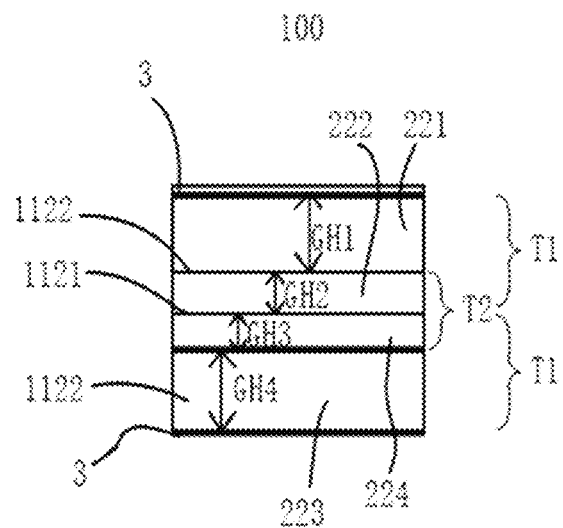
FIG. 10 is a cross-sectional view of the optical waveguide unit in FIG. 9.

For example, in FIG. 9 and FIG. 10, there are four sub-waveguides 221, 222, 223, 224 and two types 11 of total reflection layers. The total reflection layers 11 include the first type 1121 of total reflection layer in middle and two second types 1122 of total reflection layers. GH1=GH4=T2=GH2+GH3, GH2=GH3, GH1+GH2=T1=GH3+GH4, where T1 is the period of the first type of total reflection layer calculated by the above formula when the selected incident angle is θ1, and T2 is the period of the second type of total reflection layer calculated by the above formula when the selected incident angle is θ2. As illustrated in FIG. 10, T1 is the shortest distance that the first type 1121 of total reflection layer appears, and T2 is the shortest distance that the second type 1122 of total reflection layer appears.

Of course, that is not limited herein by the disclosure. In some other embodiments, when the number of groups, types and layers of total reflection layers 11 changes, the formula 2 may be employed to calculate the position period of the corresponding type of total reflection layer. The distribution of each total reflection layer 11 in each type of total reflection layer 11 may be calculated based on the formula 1. Therefore, it is more accurate to design the internal structure of the entire optical waveguide unit 100. More optionally, the height H of the cross section of the optical waveguide unit is an integer multiple of the position period $T_i$.

In some optional examples, a thickness of each layer in each type of total reflection layer is 0.04 mm<t<0.2 $T_i$.

According to some embodiments of the present disclosure, a refractive index range $n_{ei}$ of each type 11 of total reflection layer is calculated by a formula of:

$$n_{ei} = \sqrt{n^2 - 0.5 \cdot \sin(\theta_i)^2} \qquad \text{formula 3:}$$

where, $\theta_i$ represents a predetermined angle selected within a viewing angle range, and n represents a refractive index of the sub-waveguide, and n>1.4. According to the optical waveguide unit of the embodiments of the present disclosure, each type of total reflection layer corresponds to $\theta_i$ and $n_{ei}$. $\theta_i$ is a selected angle within the viewing angle range, aiming to improve the light collection efficiency of the corresponding angle and increase the uniformity of light intensity in the overall viewing angle.

It is worth noting that in order to improve the collection effect of the loss region, the relevant personnel may appropriately increase or decrease the number of total reflection layers and the number of sub-waveguides to the optical waveguide unit 100 to satisfy the light collection requirements during the implementation process. When light in the loss region is collected for multiple incident angles, multiple types of total reflection layers are required. The embodiments of the present disclosure may not impose any restrictions on the number of types and layers of the total reflection layers.

According to some further embodiments of the present disclosure, both sides of the optical waveguide unit 100 are provided with reflection layers 3 along a stacking direction of the group 1 and the sub-waveguide 2, as illustrated in FIG. 9 and FIG. 10. Optionally, the reflection layer 3 herein uses an aluminum film, which may further reduce the light loss to a certain extent.

A flat lens according to embodiments of the third aspect of the present disclosure described below with reference to FIG. 11 includes two transparent substrates 2000 and two optical waveguide arrays 1000a, 1000b according to the above embodiments.

Each of the transparent substrates 2000 has two optical surfaces, and the optical surfaces are used to protect the optical waveguide arrays 1000a, 1000b. The two optical waveguide arrays are arranged between the two transparent substrates 2000 by means of glue, and optical waveguide extending directions of the two optical waveguide arrays are arranged orthogonally. In other words, the extending directions of the optical waveguide units are mutually perpendicular, so that light beams are converged at one point, the object image surface is ensured to be symmetrical relative to the equivalent flat lens with a negative refractive index. Therefore, a negative-refractive-index phenomenon is generated, and imaging of the flat lens is realized.

Alternatively, the optical waveguide array and the transparent substrate 2000 are also bonded by a photosensitive adhesive or a heat-sensitive adhesive.

Figure 11:
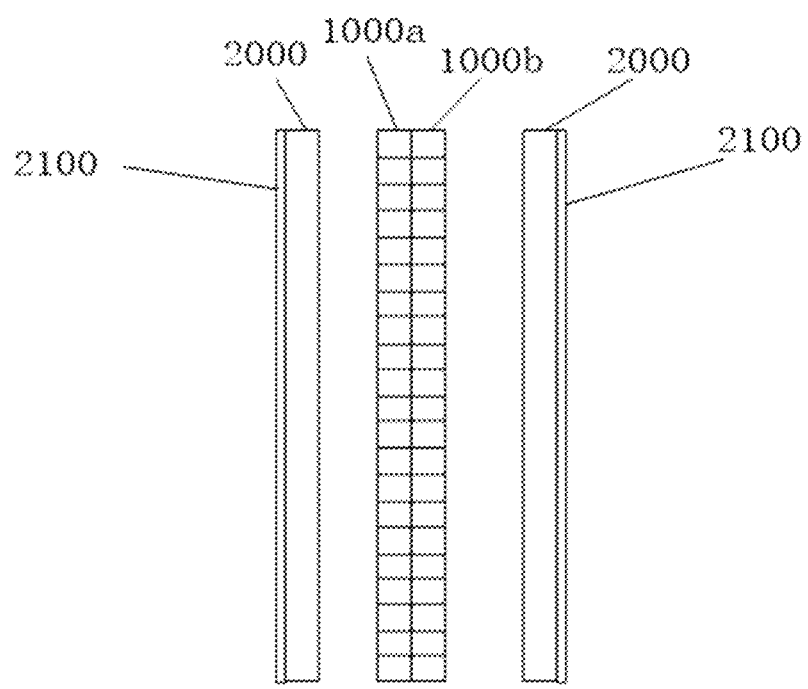
FIG. 11 is a schematic view of a flat lens according to embodiments of the present disclosure.

According to some embodiments of the present disclosure, as illustrated in FIG. 11, the optical surface of each transparent substrate 2000 far away from the optical waveguide array is provided with an antireflection film 2100 to further improve the imaging effect.

According to the flat lens provided by the embodiments of the present disclosure, the array structure is formed by adopting the optical waveguides with single-column multi-row and rectangular cross section, so that the 2D or 3D light source may be directly formed into a real image in the air to realize a real holographic image, and the imaging effect is good while the naked-eye 3D display characteristics may be realized.

In the description of the present disclosure, it is to be understood that, terms such as "length", "width", "thickness", "below", "up", "front", "back", "left", "right", "vertical", "horizontal", "top", "bottom", "in", "out", refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

Reference throughout this specification to "an embodiment," "some embodiments," "one embodiment", "another example," "an example," "a specific example," or "some examples," means that a particular feature, structure, material, or characteristic described in connection with the embodiments or examples is included in at least one embodiments or examples of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiments or examples of the disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments cannot be construed to limit the disclosure, and changes, alternatives, and modifications can be made in the embodiments without departing from spirit, principles and scope of the disclosure.

The invention claimed is:

1. An optical waveguide unit, comprising:
   at least one group of total reflection layers, each group comprising at least one type of total reflection layer, and each type of total reflection layer comprising at least one single total reflection layer; and
   at least two sub-waveguides, one group being arranged between every two adjacent sub-waveguides,
   wherein a number of the sub-waveguides is four, a number of the groups is three, and the groups comprise:
   a first type of total reflection layer in middle; and
   two second types of total reflection layers, a refractive index of the second type of total reflection layer is different from a refractive index of the first type of total reflection layer, and the two second types of total reflection layers are located on both sides of the first type of total reflection layer along a stacking direction of the group and the sub-waveguide.

2. The unit as claimed in claim 1, wherein a total height H of the optical waveguide unit satisfies 0.1 mm<H<5 mm along a stacking direction of the group and the sub-waveguide.

3. The unit as claimed in claim 1, wherein heights of the four sub-waveguides are GH1, GH2, GH3, GH4 in order along the stacking direction, where GH1=GH4=GH2+GH3, GH2=GH3, GH1+GH2=GH3+GH4.

4. The unit as claimed in claim 1, wherein a distribution of each total reflection layer in each type of total reflection layer in the group satisfies a formula of:

$$comb(x) = \sum_{i=1}^{k} \sum_{num=1}^{m_i} \delta(x - num \cdot T_i),$$

where, comb(x) represents a comb function;
one side surface of the optical waveguide unit serves as a reference plane along a stacking direction of the group and the sub-waveguide, where:
k represents a total number of types in the group;
i represents a serial number of types in the group, and is an integer;
x represents a distance from a single total reflection layer in the $i^{th}$ type of total reflection layer to the reference plane;
num represents a serial number of the single total reflection layer in the $i^{th}$ type of total reflection layer;
$m_i$ represents a total number of total reflection layers in the $i^{th}$ type of total reflection layer;
$T_i$ represents a position period of the $i^{th}$ type of total reflection layer, and the position period is a shortest distance that adjacent appearances of the $i^{th}$ type of total reflection layer in the optical waveguide unit; and
$\delta(x)$ represents a pulse function.

5. The unit as claimed in claim 4, wherein the position period $T_i$ is calculated by a formula of:

$$T_i = W \cdot \tan(\arcsin(\sin(\theta_i)/n)/\sqrt{2},$$

where, W represents a width of a cross section of the optical waveguide unit, a direction of the width on the cross section is perpendicular to the stacking direction;
$\theta_i$ represents an incident angle corresponding to the $i^{th}$ type of total reflection layer on a surface of the optical waveguide unit; and
n represents a refractive index of the sub-waveguide.

6. The unit as claimed in claim 4, wherein a thickness of each layer in each type of total reflection layer is 0.04 mm<t<0.2$T_i$.

7. The unit as claimed in claim 1, wherein a refractive index range $n_{ei}$ of each type of total reflection layer is calculated by a formula of:

$$n_{ei} = \sqrt{n^2 - 0.5 \cdot \sin(\theta_i)^2}$$

where, $\theta_i$ represents a predetermined angle selected within a viewing angle range, and n represents a refractive index of the sub-waveguide, and n>1.4.

8. The unit as claimed in claim 1, wherein both sides of the optical waveguide unit are provided with reflection layers along a stacking direction of the group and the sub-waveguide.

9. An optical waveguide array comprising:
a plurality of optical waveguide units, each optical waveguide unit having a rectangular cross section, and the plurality of optical waveguide units being joined in parallel;
an outer contour of the optical waveguide array is rectangular, and an extending direction of the optical waveguide units and at least two sides of the outer contour of the optical waveguide array form an angle of 30 to 60 degrees,
wherein each optical waveguide unit comprises:
at least one group of total reflection layers, each group comprising at least one type of total reflection layer, and each type of total reflection layer comprising at least one single total reflection layer; and
at least two sub-waveguides, one group being arranged between every two adjacent sub-waveguides,
wherein a number of the sub-waveguides is four, a number of the groups is three, and the groups comprise:
a first type of total reflection layer in middle; and
two second types of total reflection layers, a refractive index of the second type of total reflection layer is different from a refractive index of the first type of total reflection layer, and the two second types of total reflection layers are located on both sides of the first type of total reflection layer along a stacking direction of the group and the sub-waveguide.

10. The array as claimed in claim 9, wherein the extending direction of the optical waveguide units and the at least two sides of the outer contour of the optical waveguide array form an angle of 45 degrees.

11. The array as claimed in claim 9, wherein the plurality of optical waveguide units are joined through an adhesive layer, and a thickness of the adhesive layer is more than 0.001 mm.

12. A flat lens, comprising:
two transparent substrates, each transparent substrate having two optical surfaces; and
two optical waveguide arrays, the two optical waveguide arrays being arranged between the two transparent substrates by means of glue, and optical waveguide extending directions of the two optical waveguide arrays being arranged orthogonally,
wherein each optical waveguide array comprises a plurality of optical waveguide units, each optical waveguide unit having a rectangular cross section, and the plurality of optical waveguide units being joined in parallel; an outer contour of the optical waveguide array is rectangular, and an extending direction of the optical waveguide units and at least two sides of the outer contour of the optical waveguide array form an angle of 30 to 60 degrees;
wherein each optical waveguide unit comprises:
at least one group of total reflection layers, each group comprising at least one type of total reflection layer, and each type of total reflection layer comprising at least one single total reflection layer; and
at least two sub-waveguides, one group being arranged between every two adjacent sub-waveguides, wherein a number of the sub-waveguides is four, a number of the groups is three, and the groups comprise:
a first type of total reflection layer in middle; and
two second types of total reflection layers, a refractive index of the second type of total reflection layer is different from a refractive index of the first type of total reflection layer, and the two second types of total reflection layers are located on both sides of the first type of total reflection layer along a stacking direction of the group and the sub-waveguide.

13. The lens as claimed in claim 12, wherein an optical surface of each transparent substrate far away from the optical waveguide array is provided with an antireflection film.

14. The optical waveguide array as claimed in claim 9, wherein a total height H of the optical waveguide unit satisfies 0.1 mm<H<5 mm along a stacking direction of the group and the sub-waveguide.

* * * * *